Patented Jan. 5, 1926.

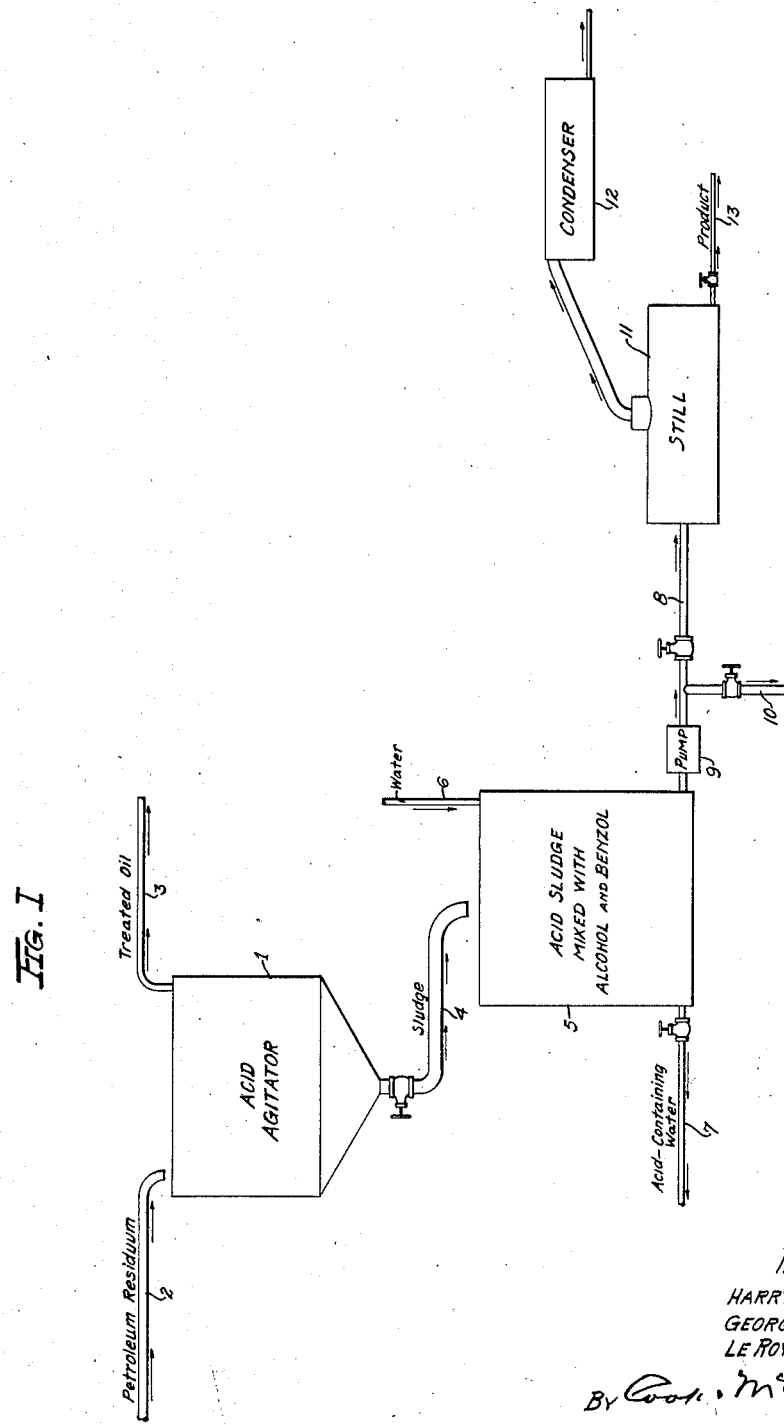

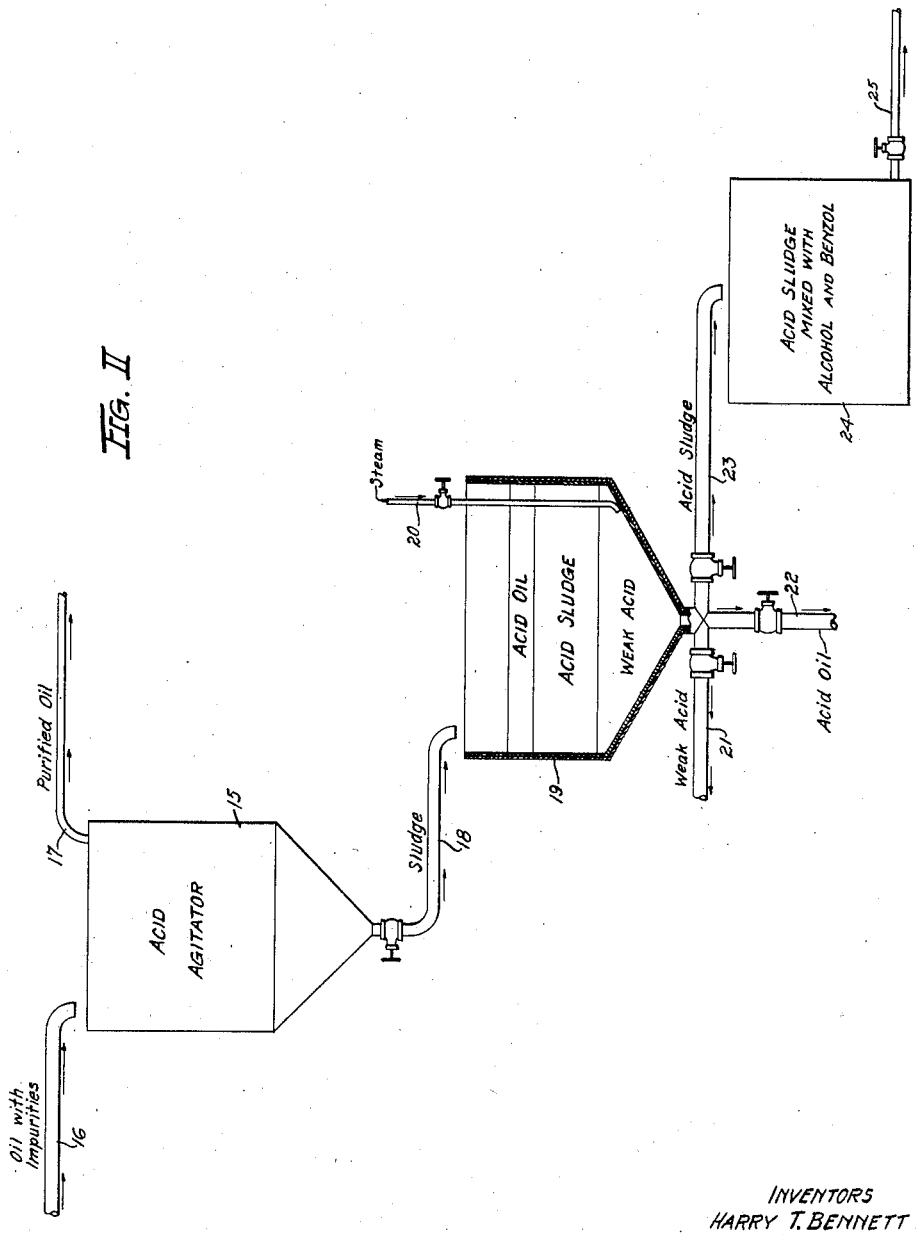

1,568,261

UNITED STATES PATENT OFFICE.

HARRY T. BENNETT, GEORGE B. MURPHY, AND LE ROY G. STORY, OF TULSA, OKLAHOMA.

PRODUCT DERIVED FROM ACID SLUDGE AND METHOD OF MAKING THE SAME.

Application filed December 20, 1924. Serial No. 757,221.

*To all whom it may concern:*

Be it known that we, HARRY T. BENNETT, GEORGE B. MURPHY, and LE ROY G. STORY, citizens of the United States of America, and residents of Tulsa, in the county of Tulsa, State of Oklahoma, have invented certain Products Derived from Acid Sludge and Methods of Making the Same, of which the following is a full, clear, and exact description, reference being had to the accompanying drawings, forming a part of this specification.

This invention relates to products derived from acid sludge and methods of making the same, and more particularly to the treatment of the sludge obtained in the purification of petroleum products. It involves the addition of a solvent, which will be hereafter described, to the sludge. We have found by actual experience that sludge, which has been regarded as an undesirable waste product, can be converted into a valuable product by merely commingling the solvent with the sludge.

Asphalt-like substances constitute some of the impurities of all petroleum products which for purification are usually treated with sulphuric acid, whereby the so-called acid-sludge is formed, and then with an absorbent or adsorbent material, such, for example, as fuller's earth, as filtering and decolorizing agent. Whatever the purifying materials may be, they contain said asphalt-like substances, the recovery of which, together with other constituents of the acid sludge, is the object of our invention.

To the accomplishment of the foregoing and related ends the invention comprises the steps hereinafter fully described and more particularly pointed out in the appended claims.

An approved method of carrying out our invention is set forth in detail in the following description, but it is to be understood that this specific disclosure does not set forth all of the several ways in which the principle of our invention may be used.

In the preferred form of our invention, the acid sludge containing asphalt-like impurities is dissolved in a solvent and thereby converted into a solution adapted for use as a paint or impregnating solution, or for the manufacture of paving blocks, roofing material, and the like.

The solvent, according to one form of our invention, includes a coal-tar product mixed with an alcohol. Depending upon the impurities to be extracted and the nature of the oil to be treated, the constituents of the solvent may vary, both with respect to composition and proportion. For example, a solvent consisting of 70 percent of commercial benzol and 30 per cent of denatured alcohol has been found very efficient for treating products of mid-continent petroleum, while products of an asphalt-base crude oil usually require a solvent containing a greater percentage of benzol.

The asphalt-like substances dissolved by and mixed with the solvent form the product resulting from one form of our improved process, but if desired, this solution may be distilled to remove and recover some or all of the solvent. The distillation of said solution to separate the solvent from the asphalt-like substances may be carried out in any well known manner, by vaporizing the solvent and condensing its vapor, thus obtaining the original solvent as distillate, and the extracted asphalt-like substances as a residue or "bottom", which forms a useful product either as a lubricating stock, cracking product, fuel oil, paving material, or the like.

According to the use of the product, the degree of distillation varies greatly. For example, if the residue is to be used as impregnating fluid, it should contain considerable solvent, but if used as a paint, less solvent is required, whereas for paving, roofing or briquetting material practically no solvent should remain in the product. In the latter form, the product has the characteristic to set to a hard film, which, together with its cheapness of manufacture, makes it an appropriate base for pitch paints, where it has the further advantage that it is insoluble in acids and petroleum oils.

Fig. I is a diagrammatical view of an apparatus adapted for use in carrying out our method.

Fig. II is a view similar to Fig. I illustrating another form of the invention.

The apparatus shown by Fig. I comprises an ordinary acid agitator 1 provided with an intake pipe 2, and a discharge pipe 3 for the treated oil. The acid sludge is removed through a pipe 4 leading to a mixing tank 5.

Water may be admitted to the tank 5 by means of pipe 6 and discharged through pipe 7. To remove the solution from tank 5, a pipe 8 is provided with a pump 9 and a branch 10. The pipe 8 leads to a still 11 equipped with a condenser 12 and a residuum outlet 13.

In carrying out the process, a petroleum product, such as a residuum from which gasoline and kerosene have been removed, may be transmitted to the acid agitator and there treated with sulphuric acid in the usual manner. The treated oil is removed through pipe 3 and the acid sludge is conducted through pipe 4 to the mixing tank 5, where it is commingled with a solvent which preferably comprises denatured alcohol and a coal tar product such as benzol. We have found that both of these fluids are desirable in the solvent, because each will dissolve some products that would not be dissolved by the other, and the mixture of alcohol and benzol will dissolve substances that would not be dissolved by successive treatments with alcohol and benzol. Consequently, the solvent produced by mixing these fluids is an important factor in the preferred form of our process, although the invention comprehends modifications and equivalents within the scope of the claims hereunto appended.

To be more specific, the solvent may consist of alcohol 30 percent and benzol 70 percent. This solvent is commingled with the sludge in tank 5, and without any further treatment the resultant mixture may be withdrawn through pipe 10 and used as a paint, although it is desirable to add a small quantity of linseed oil, or the like. A satisfactory paint can be composed of acid sludge 20 percent, solvent 75 percent and linseed oil 5 percent. The paint produced in this simple manner is a heat-resisting product adapted for use on smoke stacks and other articles exposed to high temperatures.

In making some other products it is desirable to remove a part or all of the solvent, and in some cases it is desirable to employ an excess of the solvent so as to reduce the viscosity of the sludge. In these instances, the solution may be transmitted through pipe 8 to the still 11 and distilled to recover the solvent from condenser 12, the asphaltic product being discharged through pipe 13 as a residuum.

Water may be introduced through pipe 6 to wash acid from the mixture in tank 5, and in this event the acid-containing water is removed through pipe 7.

In the system shown by Fig. II, an acid agitator 15 is provided with an intake pipe 16 for the admission of gasoline, kerosene, lubricating oil, or other oil containing impurities. The treated oil is discharged through a pipe 17 and the acid sludge is conducted through pipe 18 to a mixing tank 19 where it is washed and then permitted to settle. Steam may be introduced through pipe 20. The stratification results in the separation of acid oil and weak acid from the sludge, as suggested by the drawing. The tank 19 is provided with a discharge pipe 21 for the weak acid, a pipe 22 for the discharge of acid oil, and a pipe 23 through which acid sludge is conducted to a mixing tank 24, each of said pipes being provided with a valve as shown in the drawing.

The sludge in tank 24 is mixed with a solvent such as alcohol and benzol and the resultant solution is withdrawn through discharge pipe 25.

We claim:

1. The method of converting acid sludge containing asphalt-like substances into useful products, which comprises commingling a solvent including alcohol and a coal tar product with the acid sludge.

2. The method of making paint and similar products, which comprises commingling a mixture of alcohol and benzol with acid sludge resulting from the treatment of a petroleum product with sulphuric acid.

3. The method of making paint which comprises commingling a mixture of about 70 percent benzol and about 30 percent alcohol with acid sludge resulting from the treatment of a petroleum product with sulphuric acid.

4. The method of converting acid sludge of the character described into useful products which comprises washing the sludge with water and commingling the sludge with a solvent comprising a coal tar product and alcohol.

5. The method of converting acid sludge containing asphalt-like substances into useful products, which comprises commingling a solvent including alcohol and a coal tar product with the acid sludge, and distilling the resultant solution to remove the excess solvent therefrom.

6. The method of converting acid sludge containing asphalt-like substances into useful products, which comprises mixing and digesting said sludge with water and a solvent comprising alcohol and a coal tar product, thereby dissolving its acid content in the water and the asphalt-like substances in said solvent, and separating the acid-containing water from the dissolved asphalt-like substances.

7. A new article of manufacture comprising acid sludge residue dissolved in a solvent including alcohol and a coal tar product.

8. As a new article of manufacture, a paint comprising acid slude residue dissolved in a solvent including alcohol and benzol.

9. As a new article of manufacture, a paint comprising acid slude residue, alcohol, benzol and linseed oil.

10. As a new article of manufacture, a mixture containing acid sludge residue with asphalt-like substances therein, and a solvent including alcohol and a coal tar product.

11. As a new article of manufacture, a mixture containing acid slude residue with asphalt-like substances therein, and a solvent including alcohol and a coal tar product, the sludge being more than 15 percent of the mixture and the solvent being less than 85 percent.

In testimony that we claim the foregoing we hereunto affix our signatures.

HARRY T. BENNETT.
GEORGE B. MURPHY.
LE ROY G. STORY.